(12) United States Patent
Bushnell et al.

(10) Patent No.: US 10,620,387 B2
(45) Date of Patent: *Apr. 14, 2020

(54) EXPANDED BEAM ARRAY FOR FIBER OPTICS

(71) Applicant: CommScope, Inc. of North Carolina, Hickory, NC (US)

(72) Inventors: Brian K. Bushnell, Wylie, TX (US); Jeffrey D. Nielson, Longmont, CO (US); Scott L. Lowe, Conover, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,883

(22) Filed: Nov. 23, 2018

(65) Prior Publication Data

US 2019/0107680 A1 Apr. 11, 2019

Related U.S. Application Data

(63) Continuation of application No. 14/514,354, filed on Oct. 14, 2014, now Pat. No. 10,162,127.

(60) Provisional application No. 61/992,495, filed on May 13, 2014, provisional application No. 61/891,348, filed on Oct. 15, 2013.

(51) Int. Cl.
*G02B 6/38* (2006.01)
*G02B 6/32* (2006.01)

(52) U.S. Cl.
CPC ........... *G02B 6/3885* (2013.01); *G02B 6/325* (2013.01); *G02B 6/3863* (2013.01)

(58) Field of Classification Search
None
See application file for complete search history.

(56) References Cited

U.S. PATENT DOCUMENTS

| 4,991,929 A | 2/1991 | Bowen et al. |
| 5,281,301 A | 1/1994 | Basavanhally |
| 6,623,174 B2 | 9/2003 | Perko et al. |
| 6,880,980 B2 | 4/2005 | Kang et al. |
| 7,004,644 B1 | 2/2006 | Johnson |
| 7,898,736 B2 | 3/2011 | Jacobowitz et al. |

(Continued)

FOREIGN PATENT DOCUMENTS

| JP | 2014-182341 | 9/2014 |
| JP | 2016-045363 | 4/2016 |
| WO | WO 2012/106510 | 8/2012 |

*Primary Examiner* — Chad H Smith
(74) *Attorney, Agent, or Firm* — Muncy, Geissler, Olds & Lowe, P.C.

(57) ABSTRACT

An expanded beam fiber optic array connector includes a ferrule holding ends of optical fibers in a first ordered array. A plurality of lenses packaged into a unitary structure, formed of an optical grade material, different than a material used to form the ferrule, is attached to the ferrule. The lenses are arranged into a second ordered array matching the first ordered array of the ends of the optical fibers. The lenses of the expanded beam connector associated with transmit channels can be constructed with a prescription geared specifically for transmitting light, whereas the lenses of the expanded beam connector associated with receive channels can be constructed with a prescription geared specifically for receiving light.

20 Claims, 11 Drawing Sheets

(56) References Cited

U.S. PATENT DOCUMENTS

| | | |
|---|---|---|
| 8,360,660 B2 | 1/2013 | Koreeda et al. |
| 8,393,804 B2 | 3/2013 | Nielson et al. |
| 8,611,712 B2 | 12/2013 | Hashimoto et al. |
| 10,162,127 B2 * | 12/2018 | Bushnell ............... G02B 6/3885 |
| 2001/0000316 A1 | 4/2001 | Kawai |
| 2001/0055446 A1 | 12/2001 | Iwashita et al. |
| 2002/0118925 A1 | 8/2002 | Matsumoto et al. |
| 2003/0053762 A1 | 3/2003 | Cheng et al. |
| 2003/0152332 A1 | 8/2003 | Kao |
| 2003/0231829 A1 | 12/2003 | Meyers et al. |
| 2004/0017984 A1 | 1/2004 | Thiele et al. |
| 2004/0033016 A1 | 2/2004 | Kropp |
| 2004/0114877 A1 | 6/2004 | Barnoski et al. |
| 2006/0245694 A1 | 11/2006 | Chen et al. |
| 2007/0086707 A1 | 4/2007 | Suzuki et al. |
| 2008/0144999 A1 | 6/2008 | Takeda et al. |
| 2009/0154884 A1 | 6/2009 | Chen et al. |
| 2009/0324175 A1 | 12/2009 | Everett et al. |
| 2010/0104244 A1 | 4/2010 | Grinderslev |
| 2010/0124394 A1 | 5/2010 | Meek et al. |
| 2010/0329612 A1 | 12/2010 | Everett et al. |
| 2012/0014645 A1 | 1/2012 | Kadar-Kallen |
| 2012/0020618 A1 | 1/2012 | Erdman et al. |
| 2012/0155807 A1 | 6/2012 | Knapp |
| 2013/0039622 A1 | 2/2013 | Grinderslev |
| 2013/0216189 A1 | 8/2013 | Grinderslev et al. |
| 2013/0251315 A1 | 9/2013 | Isenhour et al. |
| 2014/0099057 A1 | 4/2014 | Sun et al. |
| 2014/0133803 A1 | 5/2014 | Rosenberg et al. |
| 2015/0104135 A1 | 4/2015 | Bushnell et al. |
| 2015/0331201 A1 | 11/2015 | Takano et al. |

\* cited by examiner

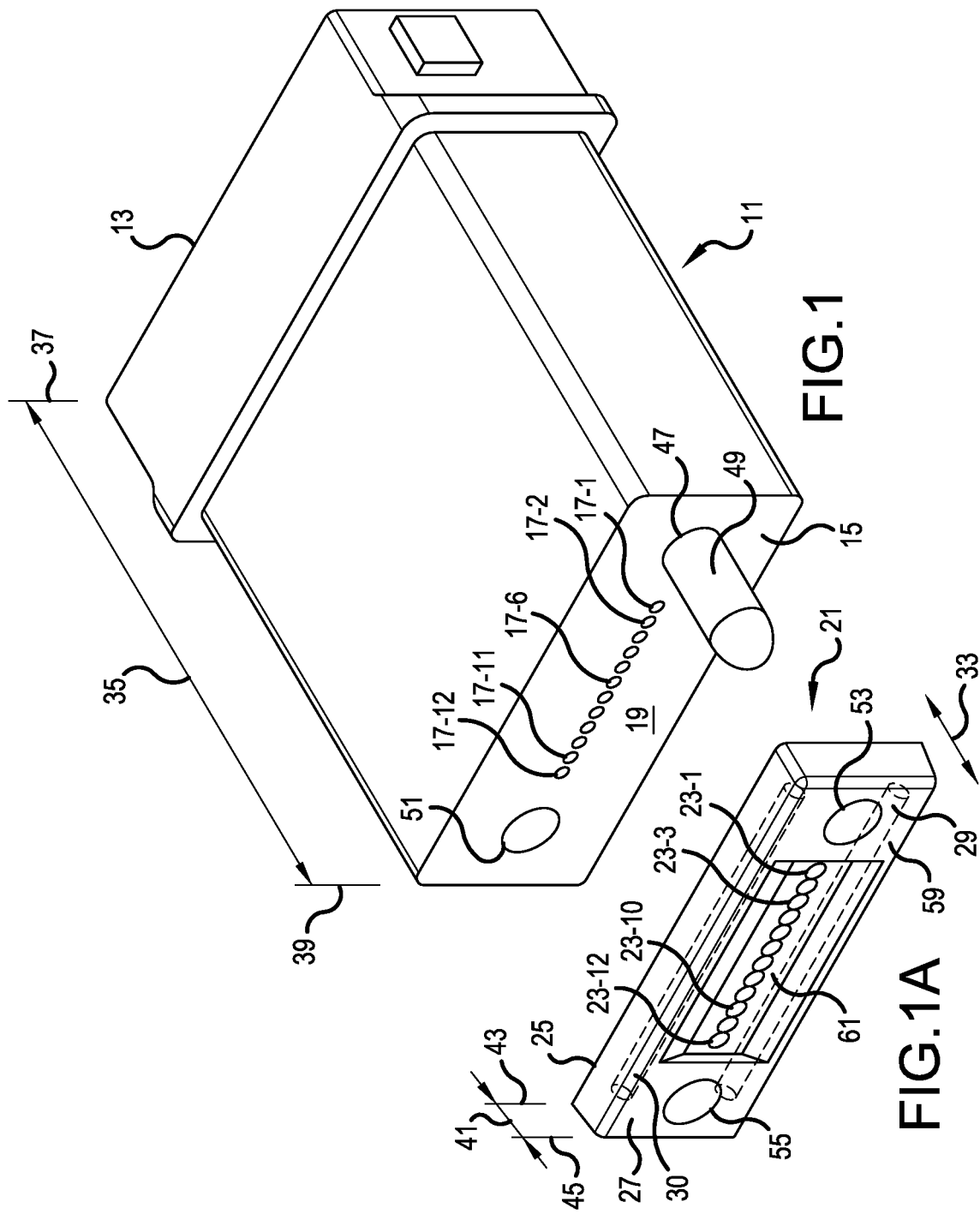

EXPANDED BEAM ARRAY FOR FIBER OPTICS

This application is a continuation of application Ser. No. 14/514,354, filed Oct. 14, 2014, which claims the benefit of U.S. Provisional Application No. 61/992,495, filed May 13, 2014, and U.S. Provisional Application No. 61/891,348, filed Oct. 15, 2013, both of which are herein incorporated by reference.

BACKGROUND OF THE INVENTION

1. Field of the Invention

The present invention relates to an expanded beam multi-fiber connector.

2. Description of the Related Art

An MTP/MPO (multi-fiber termination push-on/Multi-fiber Push On) or MT-RJ connector is known in the background art, such as in U.S. Pat. No. 6,880,980, which is incorporated herein by reference. Such connectors present one or more arrays of polished fiber ends at a front face of the MTP/MPO or MT-RJ connector, as shown in the figures of U.S. Pat. No. 6,880,980.

Applicants' prior U.S. Pat. No. 8,393,804, which is incorporated herein by reference, demonstrated an advantage over the array type connectors having polished fiber ends. As shown in FIGS. 13 and 14, a multi-fiber connector 81 may include pins 83 or alignment holes 85 to assist in mating the multi-fiber connector 81 into an adapter or port. A lens 91, such as spherical lenses 91-1 through 91-8 formed of sapphire, is affixed at the end of each V-groove 87 (such as V-grooves 87-1 through 87-8) for each fiber 89 (such as fibers 89-1 through 89-8) of the multi-fiber connector 81. Hence, the connector 81 is converted into an expanded beam connector, which has several advantages, as described in more detail in U.S. Pat. No. 8,393,804.

US Published Patent Application 2009/0154884, which is herein incorporated by reference, shows a modified expanded beam MT ferrule. In the design of US Published Patent Application 2009/0154884, as depicted in FIGS. 15-17, a frame 102 has a front or mating face 103. Guide pin holes 104 are formed in the front face 103. V-grooves 109 holding optical fibers 134 are located at a rear portion of the frame 102. The frame 102 has lenses 106 at the ends of the V-grooves 109. The lenses 106 are integrally molded with the frame 102 out of a common material, like a polycarbonate or Ultem (See paragraph 0015, lines 6-8 of US Published Patent Application 2009/0154884).

Therefore, US Published Patent Application 2009/0154884 offers an advantage over U.S. Pat. No. 8,393,804 in that the lenses 106 are not separate elements which must be assembled/adhered to the V-grooves 109, but are rather integrally molded features of the frame 102 adjacent to the V-grooves 109. Because the lenses 106 are integrally molded, the frame 102 requires "precision machining and tooling" (See paragraph 0016, lines 13-14 of US Published Patent Application 2009/0154884). The other portions of the connector do not require precision machining or tooling, like the housing 112 and boot 124. The housing 112 can be formed of glass filled thermo plastics, such as liquid crystal polymer. The boot 124 may be formed of thermo plastic rubber, such as a polypropylene vulcanization elastomer.

Additional related art may be found in the following documents, each of which is herein incorporated by reference: 2001/0055446; 2002/0118925; 2004/0017984; 2006/0245694; 2009/0324175; 2010/0329612; 2012/0014645; 2012/0020618; 2012/0155807; 2013/0251315 and WO 2012/106510.

SUMMARY OF THE INVENTION

The Applicant has appreciated drawbacks in the above-described connectors of the prior art. For example, precision molding of the frame 102 can lead to manufacturing difficulties. Parts must be checked for tolerances, and defective parts must be recycled. The molding equipment is rather complex with many moving elements, making it expensive to manufacture. Further, the molding equipment requires added maintenance to keep tolerances adequate.

Because the lenses 106 are part of the frame 102, the entire frame 102 must be molded of a material suitable for the lenses 106, e.g., to transmit light. The single polymer used in the molded multifiber expanded beam connector ferrules must be free of fillers and contaminants in order to transmit light consistently. In other words, the polymer used for the frame cannot contain fillers such as glass, carbon or quartz fibers, which are commonly used to form ferrules in order to provide strength and to reduce thermal expansion/contraction during environmental temperature changes. The resulting monolithic molded ferrule including lenses of the prior art design has less strength. Also, the ferrule and lens assembly of the prior art has greater expansion/contraction and greater change in attenuation during thermal cycling than ferrules made with "filled" polymers.

Where the lenses are integrally molded, most monolithic multifiber expanded beam ferrules are molded from polyetherimide. Polyetherimide is a compromise material for light transmittance, strength and coefficient of thermal expansion (CTE). However, polyetherimide has significant absorption, e.g., 10-20% absorption over the electromagnetic spectrum. To attain sufficient strength using polyetherimide, the component parts are also made thicker. A thicker lens presents more material to absorb, i.e., attenuate, light. Signal losses of 0.25 dB to 0.5 dB per lens transition are typical.

The signal attenuation through the lens material may lead to a drawback in that fiber cords employing connectors with the integrally molded lenses can only run from transceiver to transceiver. In other words, if 10-20% of the signal light is absorbed at a first connector attached to a first transceiver and another 10-20% of the signal light is absorbed at the connector at the other end of the fiber cord, the signal has been significantly attenuated by the fiber cord. Daisy-chaining fiber cords between transceivers could produce too much attenuation and cause a failure in the communication system. For example, daisy-chaining three fiber cords employing connectors with the integrally molded lenses would cause the light signal to pass through six lens formed of polyetherimide, with each lens attenuating 10 to 20% of the light signal strength, e.g., up to a 3 dB signal drop.

Conversely, materials suitable for light transmittance are often times not suitable for the connector ferrule parts, e.g., the V-grooves, because of poor thermal expansion characteristics. For example, if the V-grooves are moving, expanding and contracting, during a thermal cycle, the performance of the connector may be impaired. The connector may suffer attenuation during a portion or portions of the thermal cycle of the V-grooves. Contracting or expanding results in pulling or pushing the fibers in the V-grooves out of optimum alignment with the lenses, and/or stresses the juncture with the optical epoxy, and/or stresses the optic fibers themselves. This may manifest itself as an erratic connector, which fails only under certain thermal conditions. Also, when the other mating parts of the connector, e.g., the housing and/or the boot, are formed of different materials, e.g., materials impregnated with fiber or glass to improve thermal expansion characteristics, the difference in expansion between the two materials of the connector can lead to mechanical stresses within the connector and to signal attenuation within the connector.

It is an object of the present invention to provide an expanded beam multi-fiber connector, which enjoys the benefits of integrally molded lens, e.g., reduced assembly time and labor, while avoiding some of the drawbacks of integrally molded lens, as appreciated by the Applicant and described above.

The Applicant has appreciated that an expanded beam multi-fiber connector's performance can be enhanced by customizing the lenses of the multi-fiber connector for light transmittance or light reception. In other words, most multi-fiber connectors have fiber ends dedicated to transmit channels and fiber ends dedicated to receive channels. For example, if an eight fiber MPO connector is used in conjunction with four transceivers, the MPO would typically have four transmit channels and four receive channels.

The lenses of the expanded beam connector associated with transmit channels can be constructed with a prescription geared specifically for transmitting light, whereas the lenses of the expanded beam connector associated with receive channels can be constructed with a prescription geared specifically for receiving light. The details will be described in more detail below.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 1 is a perspective view of a fiber optic ferrule, in accordance with the present invention;

FIG. 1A is a perspective view of a lens array element, in accordance with the present invention;

DETAILED DESCRIPTION OF EMBODIMENTS OF THE INVENTION

Figure 1B:
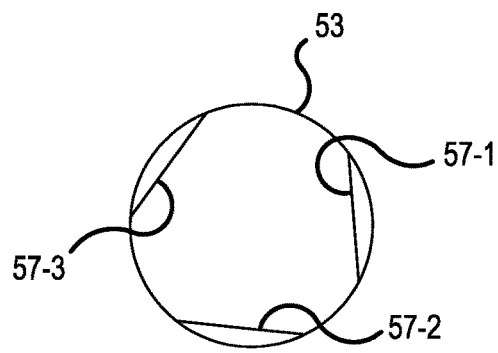
FIG. 1B is a close up view of a hole within the lens array element of FIG. 1A.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figures 2, 2A:
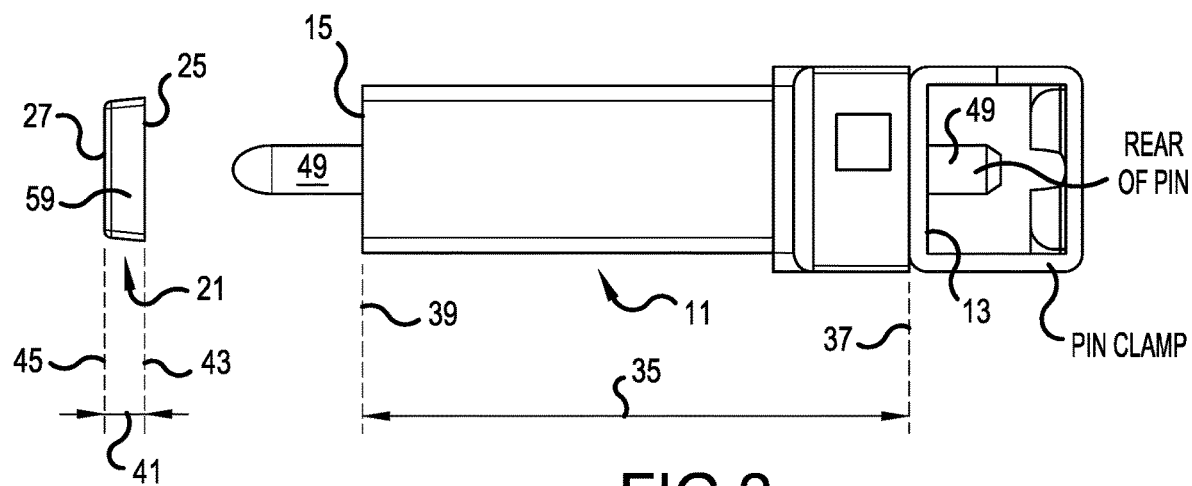
FIG. 2 is a side view of the fiber optic ferrule of FIG. 1.
FIG. 2A is a side view of the lens array element of FIG. 1A.
Figure 3A:
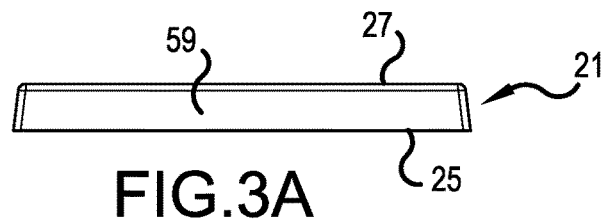
FIG. 3A is a top view of the lens array element of FIG. 1A.
Figure 3:
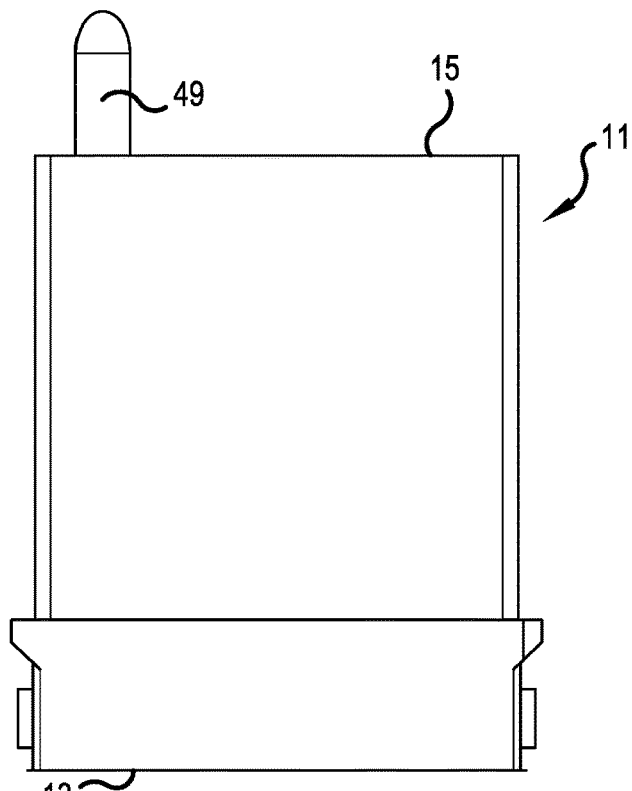
FIG. 3 is a top view of the fiber optic ferrule of FIG. 1.

FIGS. 1 and 1A are perspective views of a fiber optic ferrule and a lens array element, respectively, in accordance with the present invention. FIG. 1B is a close up view of a hole within the lens array element of FIG. 1A. FIGS. 2 and 2A are side views of the fiber optic ferrule and the lens array element of FIGS. 1 and 1A, respectively. FIGS. 3 and 3A are top views of the fiber optic ferrule and the lens array element of FIGS. 1 and 1A, respectively.

FIGS. 1 and 1A; 2 and 2A; and 3 and 3A are exploded views showing the fiber optic ferrule and lens array element as first and second parts, just before assembly. In an assembled state the first and second parts form an expanded beam fiber optic array connector.

Figure 4:
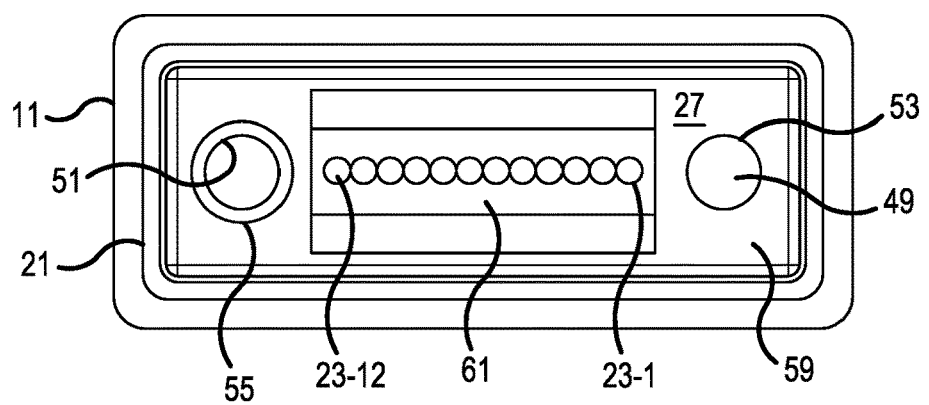
FIG. 4 is a front view of the expanded beam fiber optic array connector with the lens array of FIG. 1A assembled to the fiber optic ferrule of FIG. 1.

FIG. 4 is a front view with the expanded beam fiber optic array connector with lens array of FIG. 1A assembled to the fiber optic ferrule of FIG. 1.

Looking at FIGS. 1-4, a first part 11 for holding a plurality of optical fibers has a first end 13 and a second end 15. The second end 15 is opposite to the first end 13. The first part 11 resembles a typical MT ferrule for a typical MTP/MPO connector and may be formed of a polymer impregnated with a material to provide strength and reduce the coefficient of thermal expansion (CTE) of the first part 11.

Plural optical fibers enter at the first end 13 of the first part 11 and extend to the second end 15 of the first part 11. Along the length of the first part 11, the optical fibers may reside in V-grooves for holding said plural optical fibers in a spaced array, as depicted in the prior art described above. At the second end 15, ends 17-1 through 17-12 of the plurality of optical fibers are presented in a first ordered array at a surface 19 defining the second end 15 of the first part 11. The ends 17-1 through 17-12 may be polished smooth with the surface 19, polished with fiber protrusion relative to surface 19, cleaved or otherwise assembled with protrusion relative to surface 19. Although twelve fibers are illustrated, other numbers of fibers are possible, such as a single row of eight fibers, or two rows of fibers with eight or twelve or sixteen fibers in each row, or three rows of fibers with eight or twelve or sixteen fibers in each row. Basically, the fiber ends 17-1 through 17-12 may be arranged in the same manner as shown in the prior art described above. The optical fibers may have any size, such as the common 125 micron diameter size or uncommon sizes such as an 80 micron diameter size.

A second part 21 has a first face 25 and a second face 27, opposite to the first face 25. The first face 25 of the second part 21 abuts the second end 15 and/or the surface 19 of the first part 11, when the second part 21 is assembled to the first part 11.

A plurality of lenses 23-1 through 23-12 are formed in the second part 21. The plurality of lenses 23-1 through 23-12 are arranged into a second ordered array matching the first ordered array of the ends 17-1 through 17-12 of the optical fibers. Each lens 23-1 through 23-12 overlies a respective end 17-1 through 17-12 of one of the plurality of optical fibers, when the second part 21 is assembled to the first part 11.

In one embodiment, the second part 21 is a unitary structure and is formed of an optical grade material, different than the material used to form the first part 11. For example, the second part 21 may be formed of fused silica, fused quartz, sapphire, silicon, other optical glasses or optical grade polymers. In a preferred embodiment, the second part 21 is entirely formed of optical grade polycarbonate.

A stiffening element or elements 29 and/or 30 may optionally be attached to the second element 21. The stiffening elements 29 and/or 30 may extend in a direction substantially perpendicular to a direction 33 defined from the first face 25 of the second part 21 to the second face 27 of the second part 21, which is also the direction in which the V-grooves holding the optical fibers extend. The stiffening elements 29 and/or 30 may be formed as rods, and embedded within a material forming the second part 21. The stiffening elements 29 and/or 30 improve the coefficient of thermal expansion (CTE) of the second part 21, by making the overall CTE of the second part closer to the CTE of the first part 11.

In a preferred embodiment, a first distance 35 is defined from a first plane 37 encompassing the first end 13 of the first part 11 to a second plane 39 encompassing the second end 15 of the first part 11. A second distance 41 is defined from a third plane 43 encompassing the first face 25 of the second part 21 to a fourth plane 45 encompassing the second face 27 of the second part 21. A sum of the first and second distances 35 and 41 is about 8 mm. In other words, the first part 11, while resembling a typical MT ferrule, actually has a shortened length 35. When the second part 21 is assembled to the first part 11, the combined lengths 35+41 will be approximately the same as the length, e.g., 8 mm, of a typical MT ferrule.

It is also within the purview of the present invention for the first part to be a typical length MT ferrule having a first distance 35 equaling about 8 mm. Then, when the second part 21 is assembled to the first part 11, the combined lengths 35 and 41 will create an expanded beam fiber optic array connector having an overall length greater than the typical MT ferrule. In other words, the second part 21 may be assembled to the prior art's standard MT ferrule.

To assemble the second part 21 to the first part 11, one embodiment of the invention has an optical epoxy attaching each lens 23-1 through 23-12 to a respective end 17-1 through 17-12 of one of the plurality of optical fibers. Epoxy may also attached other portions of the first face 25 of the second part 21 to other portions of the surface 19 of the first part 11.

In an alternative embodiment, the second part 21 may be removably attached to the first part 11 by a friction fit. To this end, a first hole 47 is formed in the first part 11 for accepting a first guide pin 49. A second hole 51 may also be formed in the first part 11 for accepting a second guide pin (not shown) of a mating connector (not shown). A third hole 53 is formed in the second part 21 for accepting the first guide pin 49. A fourth hole 55 is also formed in the second part 21 for accepting the second guide pin.

The first guide pin 49 may be held by a pin clamp (FIG. 2) then passed through the first and third holes 47 and 53. The third hole 53 may include at least one protruding surface formed on its perimeter extending toward a center of the third hole 53 to create a frictional engagement with the first guide pin 49. In a preferred embodiment (as shown in FIG. 1B), the third hole 53 includes three evenly spaced flats 57-1, 57-2 and 57-3 around its perimeter, with each flat 57 slightly extending toward the center of the third hole 53. The fourth hole 55 may likewise include at least one protruding surface 57 formed on its perimeter extending toward a center of the fourth hole 55 to create a frictional engagement with the second guide pin of the first part 11, if the first part 11 is formed as a male connector having two guide pins, as shown in FIG. 1 of U.S. Pat. No. 6,880,980, discussed above.

In the embodiment of FIGS. 1-4, the first guide pin 49 is attached within the first part 11 via a pin clamp and extends outwardly from the first hole 47 through the third hole 53 for engagement with another connector (not shown). The second guide pin is part of the other connector and extends through the fourth hole 55 and into the second hole 51.

In overall structure, the second part 21 may be viewed as a bezel 59 at least partially surrounding a lens portion 61 containing the plurality of lenses 23-1 through 23-12. A forward edge of the bezel 59 defines the second face 27 of the second part 21 and extends further away from the second end 15 of the first part 11 than any part of the lenses portion 61, such that the plurality of lenses 23-1 through 23-12 are recessed into the second face 27 of the second part 21. By recessing the plurality of lenses 23-1 through 23-12 beneath the second face 27, the lenses 23-1 through 23-12 are protected from abrasion scratches during mating, e.g., abutment, between the connector faces, and also protected from abrasion scratches should the mated connectors be employed in a harsh environment prone to vibration, e.g., in a land, air or water vehicle.

The above description has shown the second part 21 being formed as a unitary piece. However, the second part 21 could be formed of primarily two parts, with the bezel 59 being formed separately from the lens portion 61. In such an instance, the bezel 59 may be formed of a different material as compared to the lens portion 61, and/or may be removable relative to the lens portion 61. For example, the bezel 59 may be formed of a same material as the first part 11, and the lenses portion 61 may be formed entirely of an optical grade of polycarbonate.

For example, an optical epoxy may attach the lens portion 61 to the ends 17-1 through 17-12 of the plurality of optical fibers. Then, after the epoxy cures, the bezel 59 may be separated from the lens portion 61, leaving the lens portion 61 affixed to the second end 15 of the first part 11. In this two-piece embodiment, the bezel 59 may serve the purpose of an alignment tool, whereby the third and fourth holes 53 and 55 engage guide pins, e.g., the first pin 49 and a temporary guide pin used for the assembly step, to bring the lens portion 61 into proper alignment with the ends 17-1 through 17-12 of the optic fibers before curing the optical epoxy to attach each lens 23-1 through 23-12 to the ends 17-1 through 17-12 of the optical fiber. If the pins and holes provide only course alignment, the bezel 59 may be slightly moved or tapped manually while the lenses 23-1 through 23-12 are viewed through a magnifying system or measured through an optical transmittance test to ensure correct alignment prior to curing the epoxy. Also, it would be possible to use manually adjustable features on the bezel 59, e.g., set screws, to abut the lens portion 61 and move the lens portion 61 relative to the bezel 59, e.g., up or down, right or left, while the bezel 59 is relatively fixed in position by the guide pins engaged within the third and fourth holes 53 and 55. Adjusting the set screws within threaded bores formed within the bezel 59 could slightly move the lens portion 61 to bring its lenses 23-1 through 23-12 into proper alignment with the ends 17-1 through 17-12 of the optical fibers, as viewed through a magnifying system or optical transmittance testing system.

A method of forming an expanded beam fiber optic array connector includes the steps of inserting a plurality of optical fibers into the first end 13 of the first part 11 until ends 17-1 through 17-12 of the plurality of optical fibers are approximately flush with the second end 15 of the first part 11. Then, cleaving and polishing the ends 17-1 through 17-12 of the plurality of optical fibers flush with or slightly protruding above the surface 19 defining the second end 15 of the first part 11. The cleaving step may be performed mechanically with a blade or alternatively with a laser. Next, abutting the second part 21 over the polished ends 17-1 through 17-12 of the plurality of optical fibers. Aligning lenses 23-1 through 23-12 within the second part 21 with the polished ends 17-1 through 17-12 of the plurality of optical fibers. And finally, attaching the second part 21 to the first part 11.

The final step of attaching the second part 21 to the first part 11 may be accomplished by frictionally engaging one or more holes, e.g., third and fourth holes 53 and 55, formed in the second part 21 to one or more pins, e.g., first guide pin 49, associated with the first part 11. If only a frictional attachment is used, the second part 21 is removably attached to the first part 11.

The step of attaching the second part 21 to the first part 11 may also include curing an epoxy residing between the first and second parts 11 and 21. In one embodiment the epoxy is an optical epoxy and also resides between the lenses 23-1 through 23-12 and the ends 17-1 through 17-12 of the optical fibers, wherein such optical epoxy functions as a waveguide to couple light signals from the ends 17-1 through 17-12 to the lenses 23-1 through 23-12 and prevents debris from coming between the ends 17-1 through 17-12 and the lenses 23-1 through 23-12.

Figure 5:
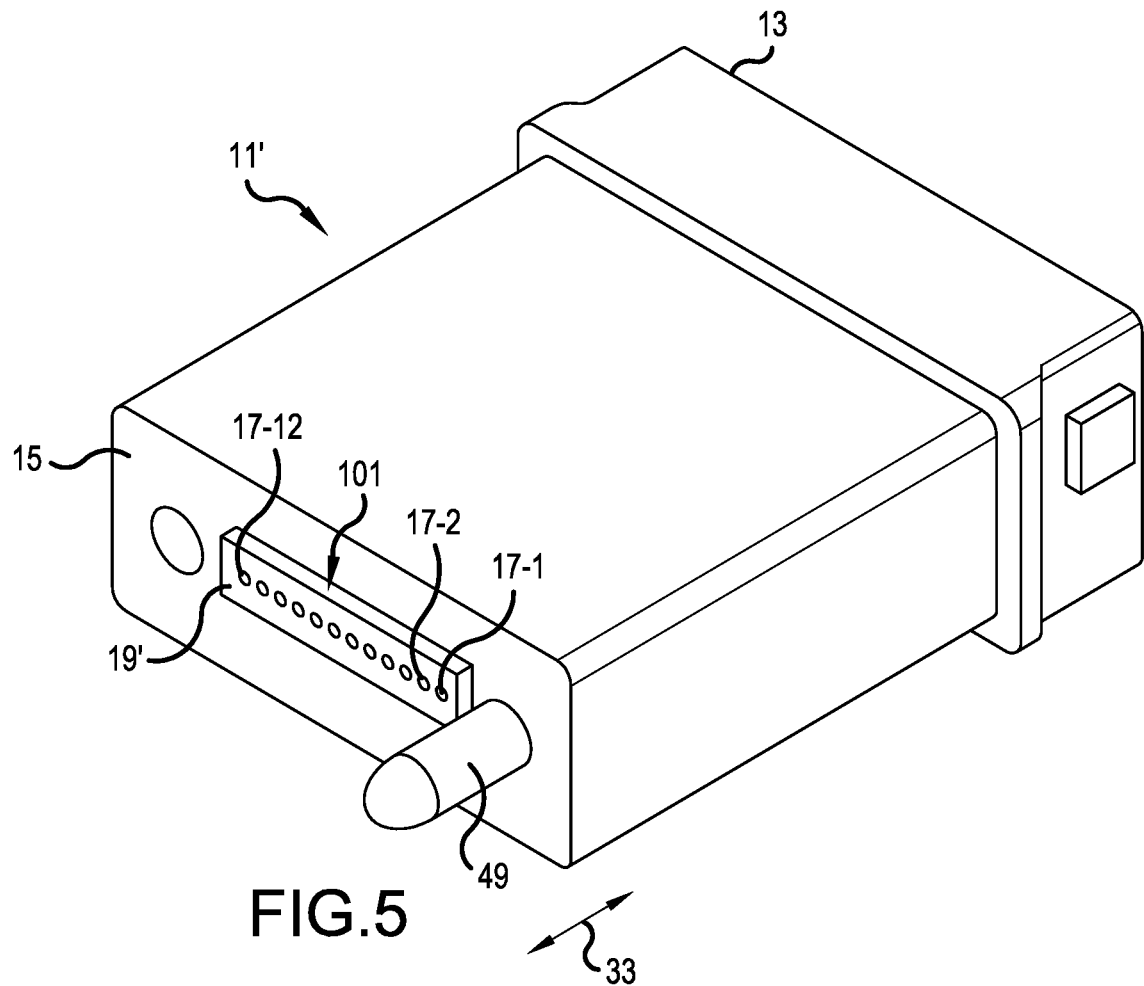
FIG. 5 is a perspective view of a fiber optic ferrule, in accordance with an alternative embodiment of the present invention.
Figure 6:
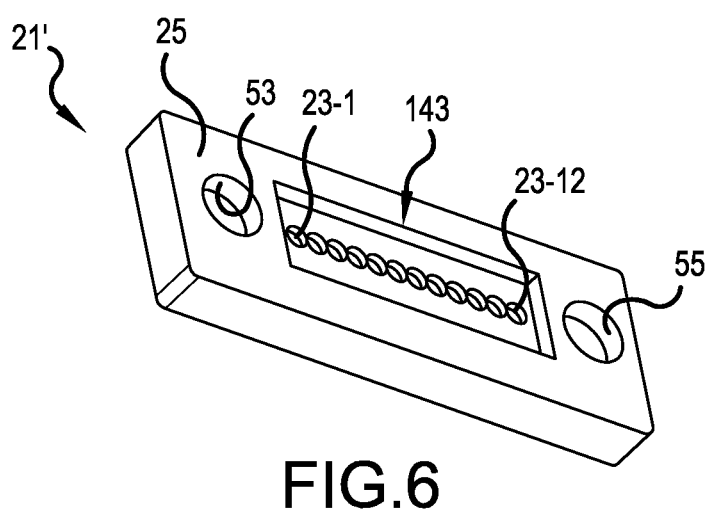
FIG. 6 is a perspective view of a rear side of a lens array element, in accordance with an alternative embodiment of the present invention.

FIGS. 5 and 6 show an alternative embodiment of the invention, where the same elements as illustrated in FIGS. 1-4 are labeled with the same reference numerals. In FIG. 5, the first part 11' has a stepped portion 101. The stepped portion 101 extends from the second end 15 of the first part 11'. The ends 17-1 through 17-12 of the plurality of optical fibers are approximately flush with, or slightly protruding from, the outer face 19' of the stepped portion 101. The ends 17-1 through 17-12 of the plurality of optical fibers may be cleaved by a blade/polishing process or by use of a laser.

The second part 21' includes a recessed portion 143 sized to fit over the stepped portion 101. A close tolerance in mating of the stepped portion 101 within the recessed portion 143 can help to provide alignment between the ends 17-1 through 17-12 of the plurality of optical fibers and the lens 23-1 through 23-12. Also, the stepped portion 101 will provide lateral support to the second part 21' in directions perpendicular to the direction 33, which will help to ensure that the second part 21' remains attached to the first part 11'. To secure the second part 21' to the first part 11', an epoxy may also be applied between the sidewalls of the stepped portion 101 and the sidewalls of the recessed portion 103.

The Applicant has also appreciated that an expanded beam multi-fiber connector's performance can be enhanced by customizing the lenses of the multi-fiber connector for light transmittance or light reception. As mentioned previously, the second part 21 or 21' could be formed of primarily two parts, with the bezel 59 being formed separately from a lens portion 61A. In such an instance, the bezel 59 may be formed of a different material as compared to the lens portion 61A, and/or may be removable relative to the lens portion 61A. For example, the bezel 59 may be formed of a same material as the first part 11, and the lenses portion 61A may be formed entirely of an optical grade of polycarbonate, or other optical materials as listed above. Such an arrangement is depicted in FIG. 7.

Figure 7:
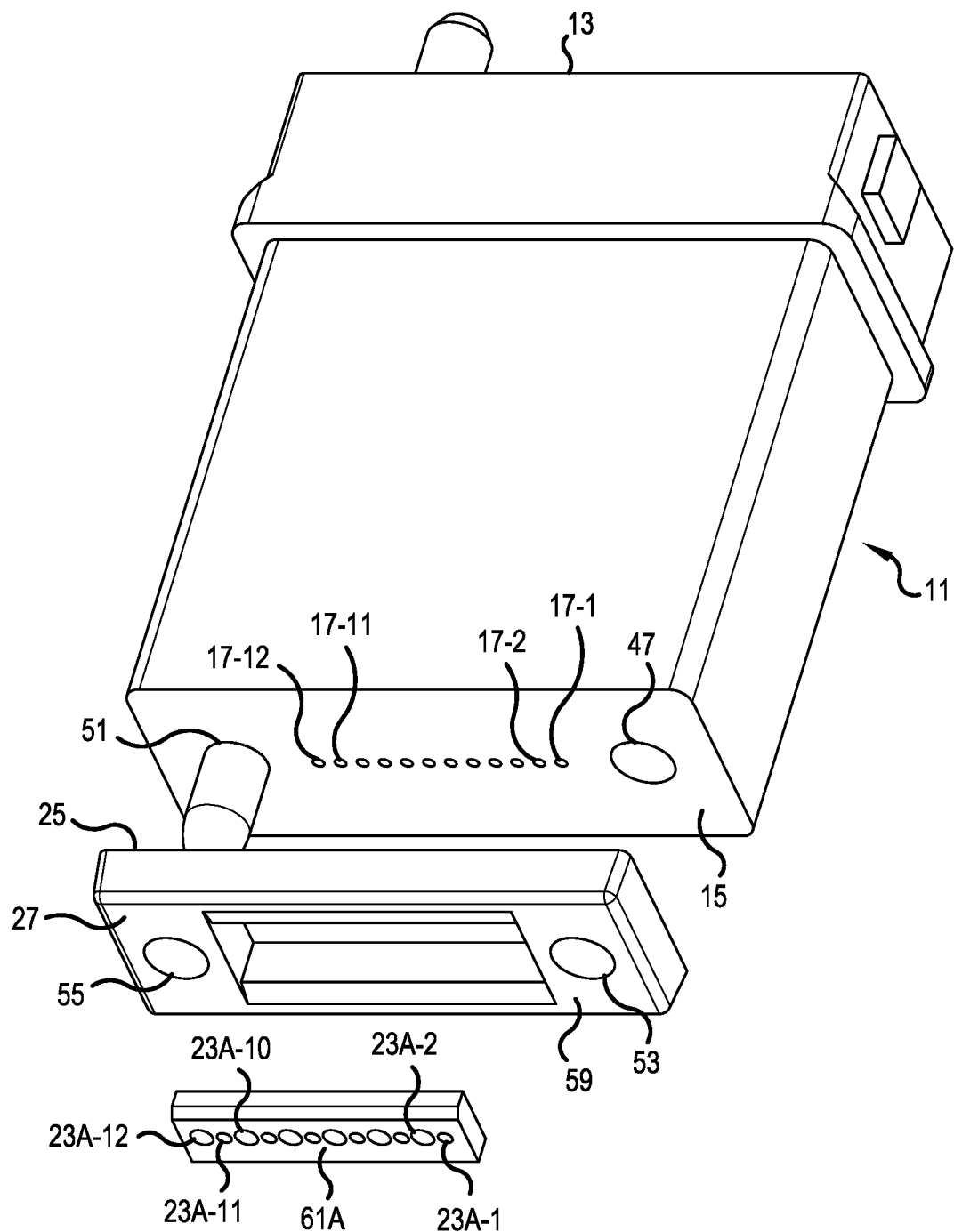
FIG. 7 is a perspective view of a fiber optic ferrule and a lens array element, similar to FIGS. 1 and 1A, but showing a two-piece lens array element.
Figure 8:
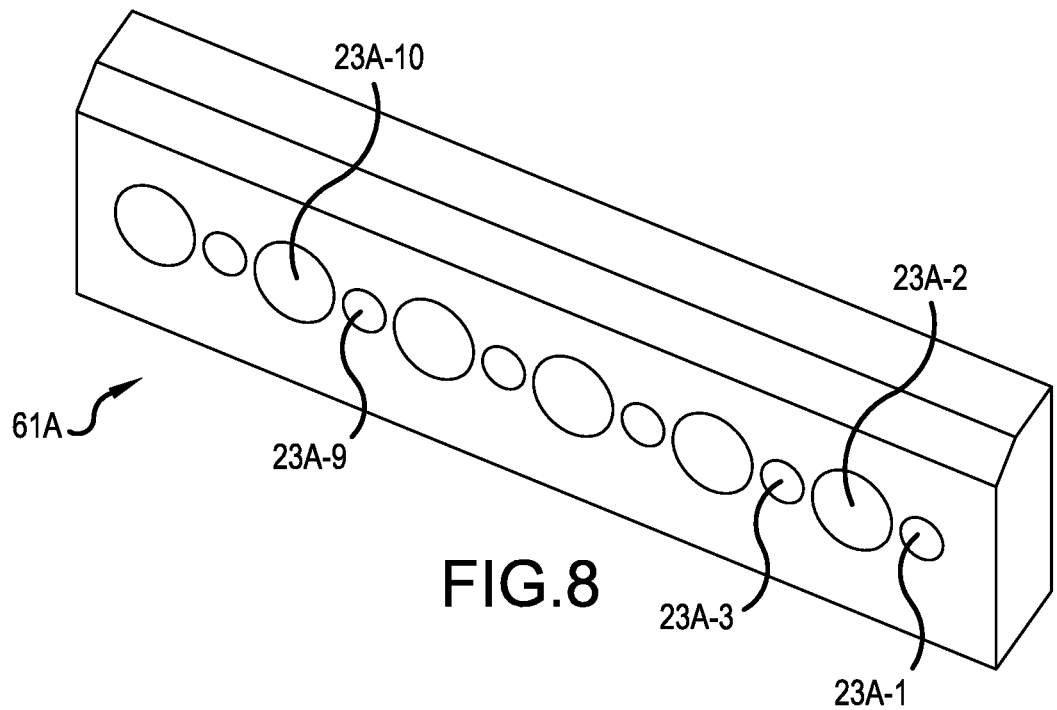
FIG. 8 is a close-up perspective view of a lens portion of FIG. 7.
Figure 9:
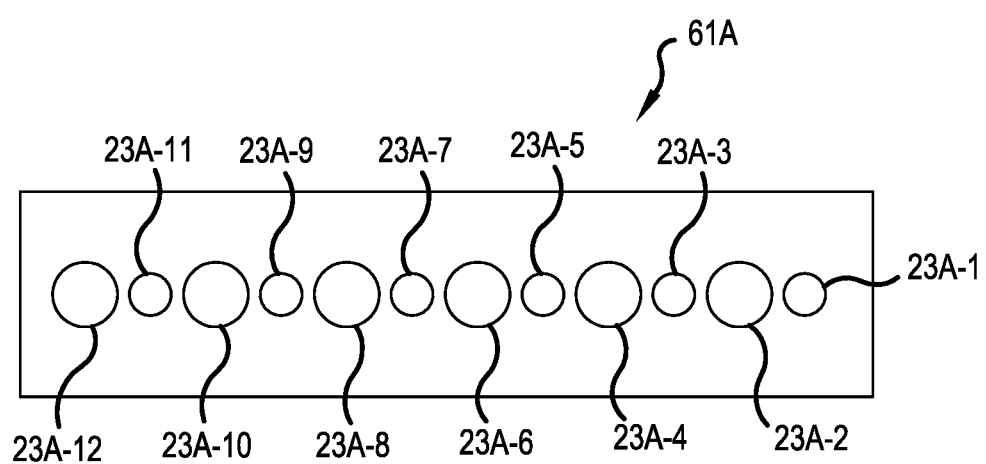
FIG. 9 is a front view of the lens portion of FIGS. 7 and 8.

FIG. 8 is a close-up perspective view of the lens portion 61A of FIG. 7. FIG. 9 is a front view of the lens portion 61A of FIGS. 7 and 8. In FIGS. 7-9, a plurality of lenses 23A-1 through 23A-12 are formed in the lens portion 61A. The plurality of lenses 23A-1 through 23A-12 are arranged into an ordered array matching the ordered array of the ends 17-1 through 17-12 of the optical fibers in the first part 11. Each lens 23-1 through 23-12 overlies a respective fiber end 17-1 through 17-12 of one of the plurality of optical fibers, when the lens portion 61A is assembled to the first part 11, in a manner as described above. The lenses 23 include lenses of a first type, e.g., type A, such as lenses 23A-1, 23A-3, 23A-5, 23A-7, 23A-9 and 23A-11. The lenses 23 also include lenses of a second type, e.g., type B, such as lenses 23A-2, 23A-4, 23A-6, 23A-8, 23A-10 and 23A-12.

The lenses 23 may be customized for light transmittance or light reception. For example, type A lenses could be optimized for receiving a light signal, whereas type B lenses could be optimized to transmit a light signal. Lenses 23 may be optimized for transmittance of light or reception of light by having difference prescriptions. The term "different prescriptions" means that a first lens relative to a second lens intentionally affects light differently. The different prescription may be caused by a different shape, size and/or material content, such as a different index of refraction.

FIG. 9 shows the transmit and receive channels alternating along the face of the lens portion 61A. When a first expanded beam multi-fiber connector is mated to a second expanded beam multi-fiber connector, each type A lens of the first connector faces to a type B lens of the second connector. Likewise, each type B lens of the first connector faces to a type A lens of the second connector. Of course, alternating the transmit and receive channels in the multi-fiber connector is only one example of a fiber layout.

Figure 10:
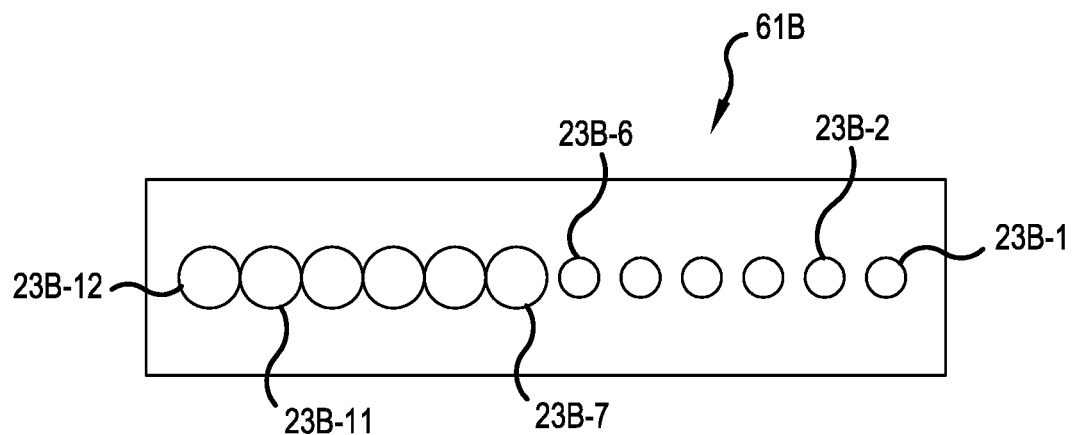
FIG. 10 is a front view of a lens portion having a first alternative lens placement arrangement.

FIG. 10 illustrates a lens portion 61B wherein the type A lenses may be located in the lens positions 23B-1 through 23B-6 and the type B lenses may be located in the lens positions 23B-7 through 23B-12. Type A lenses could be optimized for receiving a light signal, whereas type B lenses could be optimized for transmitting a light signal. Hence, the expanded beam multi-fiber connector is designed to have receiving fiber ends 17-1 through 17-6 ending behind lens positions 23B-1 through 23B-6, and transmitting fiber ends 17-7 through 17-12 ending behind lens positions 23B-7 through 23B-12.

Figure 11:
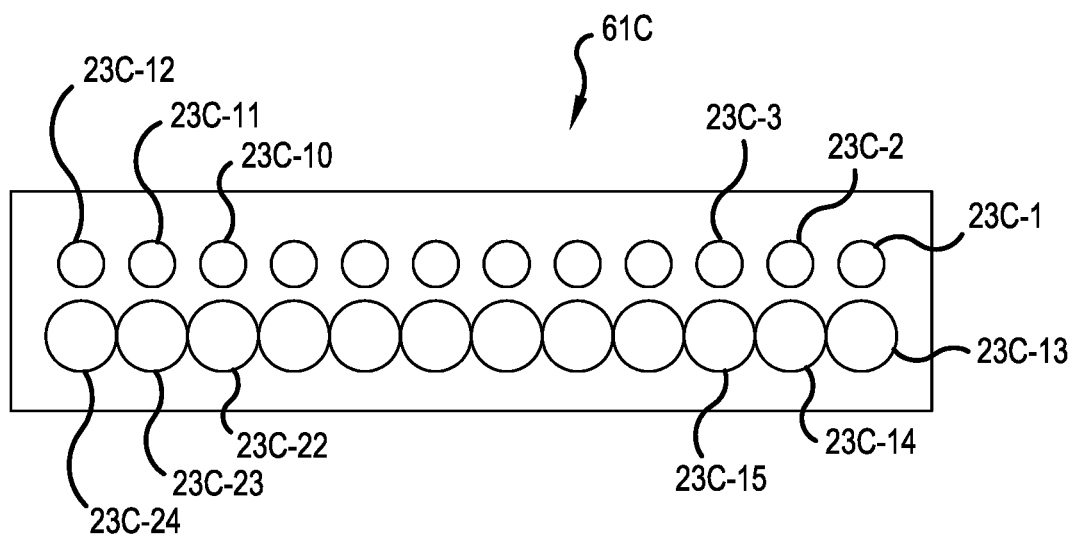
FIG. 11 is a front view of a lens portion having a second alternative lens placement arrangement.

FIG. 11 illustrates a lens portion 62C wherein the type A lenses are located in a first row of lens positions 23C-1 through 23C-12 and type B lenses are located in a second row of lens positions 23C-13 through 23C-24. Type A lenses could be optimized for receiving light signals, whereas type B lenses could be optimized for transmitting a light signal. Hence, the expanded beam multi-fiber connector is designed to have receiving fiber ends 17-1 through 17-12 ending behind lens positions 23C-1 through 23C-12, and transmitting fiber ends 17-13 through 17-24 ending behind lens positions 23C-13 through 23C-24. Of course, more than two rows of fiber ends 17 and lens 23 may be represented on the multi-fiber connector's face, such as three rows or six rows.

In accordance with the present invention, the lens portions 61A, 61B, 61C may be formed similar to the lens portion 61 described above, e.g., may include the stiffening element or elements 29 and/or 30, and may cooperate with the first part 11 or 11', as described above. Further, the lens portions 61A, 61B, 61C need not be separable from the bezel 59. In other words, the lens portions 61A, 61B, 61C may be integrally formed with the bezel 59, as a unitary second part 21.

Figure 12:
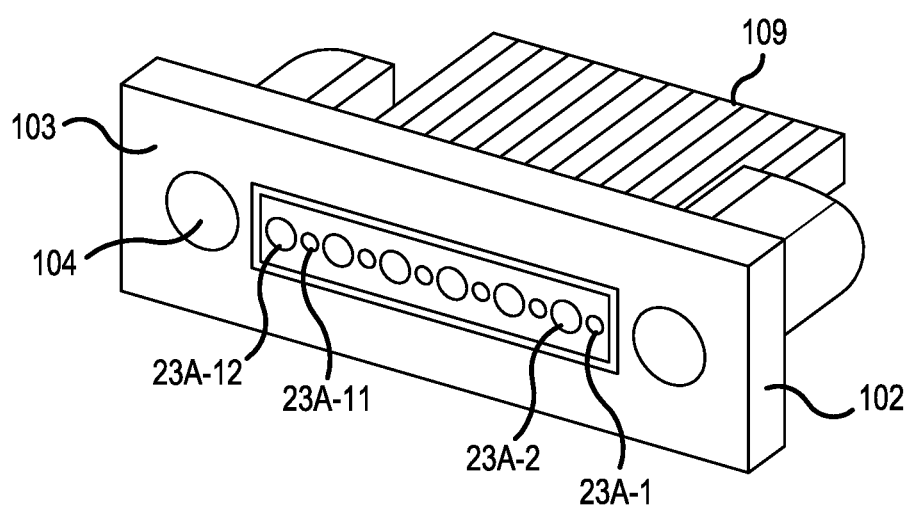
FIG. 12 is a perspective view of a frame with a lens placement consistent with FIGS. 7-9, in accordance with the present invention.
Figure 13:
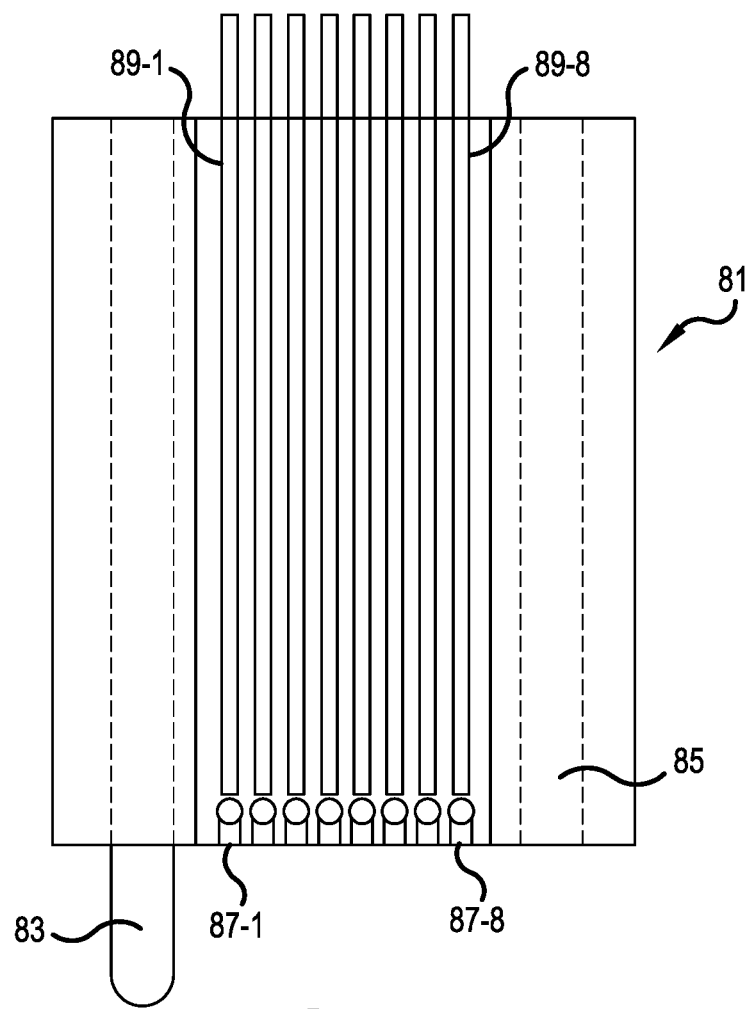
FIG. 13 is a top view of fibers in V-grooves leading up to lenses within an MT ferrule, in accordance with the prior art.
Figure 14:
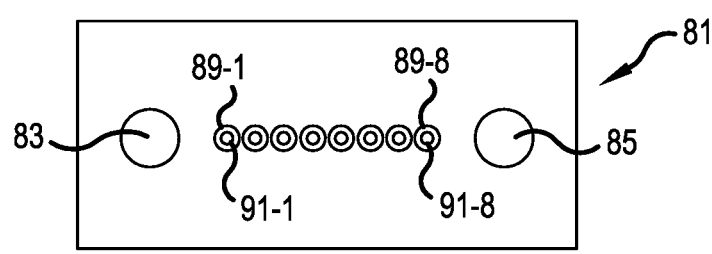
FIG. 14 is an end view of a mating face of the MT ferrule of FIG. 13.
Figure 15:
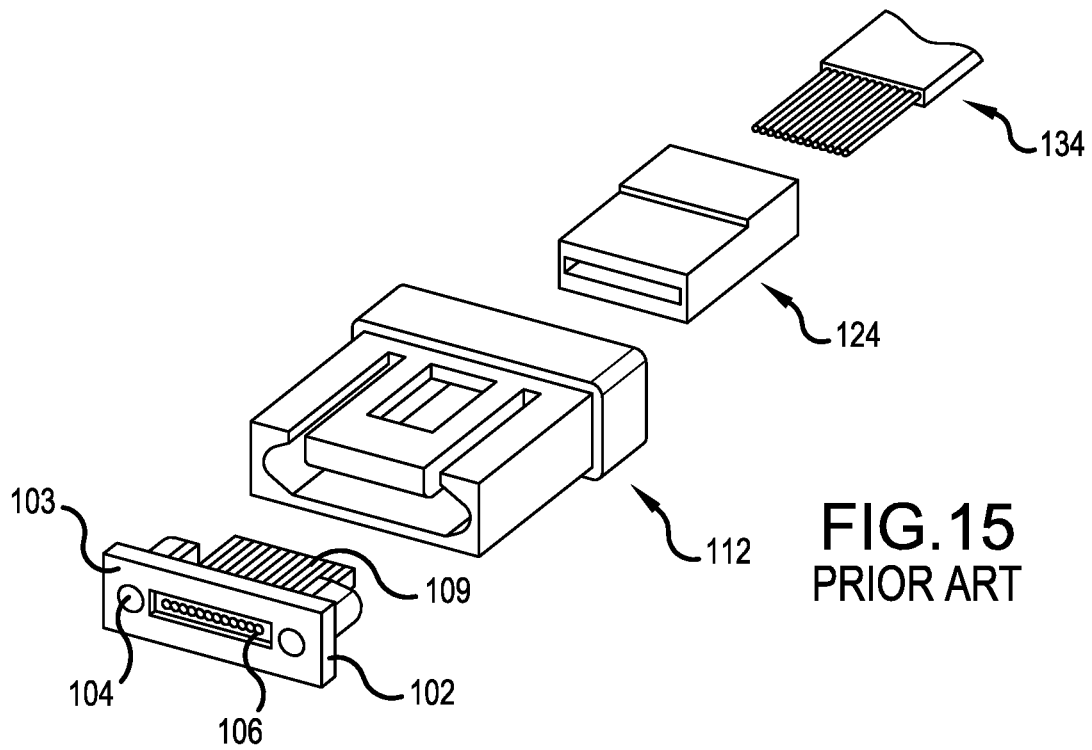
FIG. 15 is an exploded front perspective view of a lensed MT ferrule, in accordance with the prior art.
Figure 16:
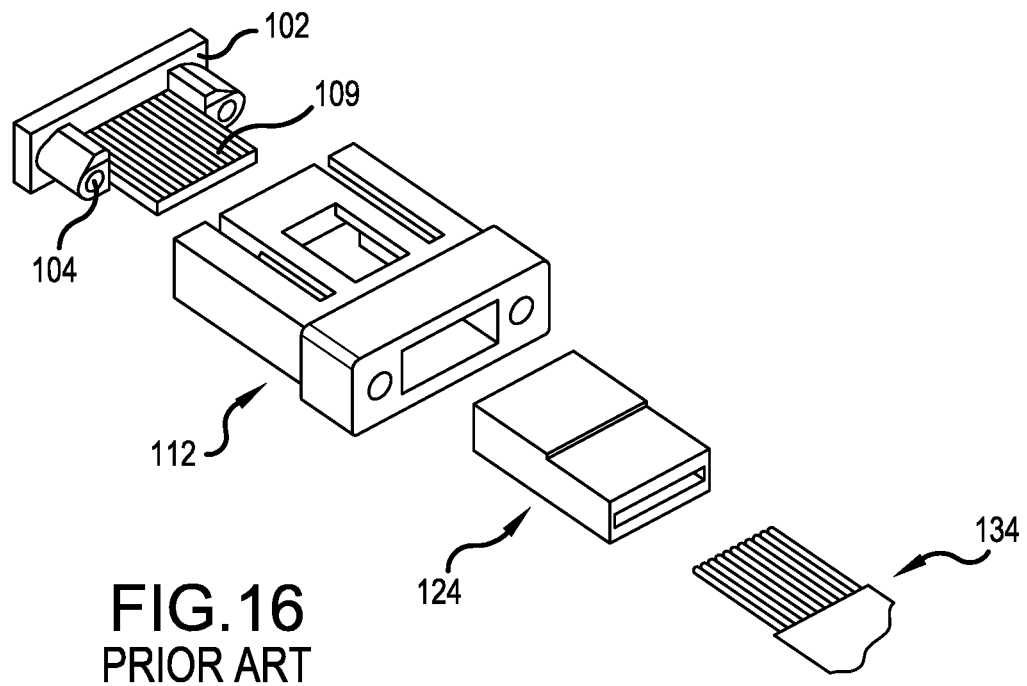
FIG. 16 is an exploded rear perspective view of the lensed MT ferrule of FIG. 15.
Figure 17:
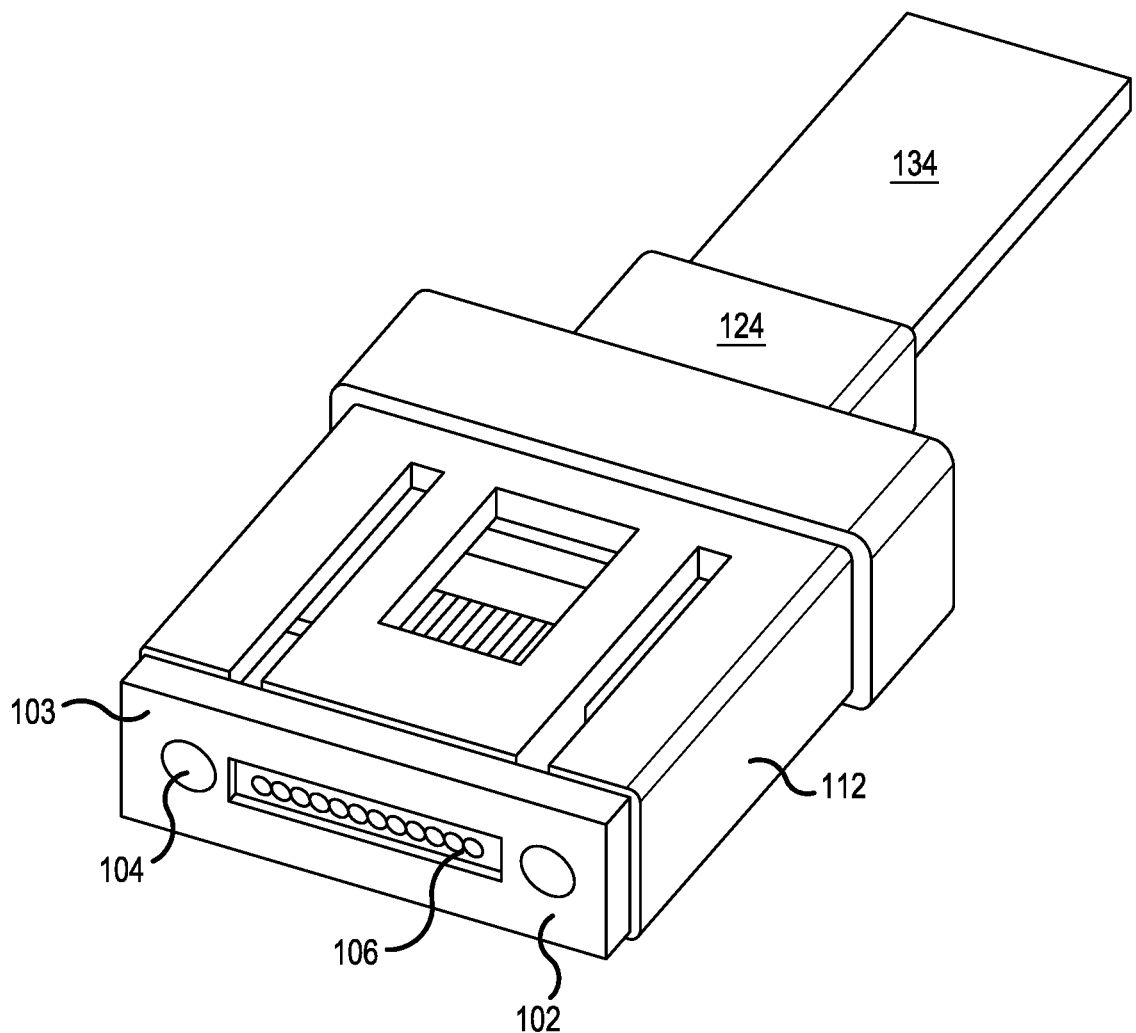
FIG. 17 is a front perspective view of the fully assembled lensed MT ferrule of FIG. 15.

Moreover, benefits of the present invention's customized lens prescriptions could be employed in the structure of US Published application 2009/0154884 and devices similar thereto, wherein the first and second parts are unitarily formed of a same material, like Polyetherimide. FIG. 12 depicts the configuration wherein the prescription lenses 23A-1 through 23A-12 for receiving light and transmitting light are employed in the frame 102 of the 2009/0154884 device.

In summary, fiber optic jumpers, patch cords, trunk cables, fanouts and other cable configurations provide optical connectivity in numerous spaces including LANs, WANs, Datacenters, high performance computers, vehicles, aircraft, weapons and ships. Some harsh environment fiber optic cables use expanded beam optical connectors. Expanded beam connectors require lower coupling force and are highly insensitive to mechanical shock, dust and vibration. In an expanded beam connector system, an optical fiber core radiates energy into a lens or an array of lenses with spherical or aspherical profiles. The light energy expands in the lens, exits the opposite side of the lens and travels through space to a second, receiving lens. The light energy is focused in the second lens and exits the second lens to enter a receiving optical fiber. Light may also be emitted from LEDs, lasers or other sources and focused into optical fiber using lenses.

Existing multi-fiber expanded beam connectors are terminated with complex time consuming procedures. The steps include:

1) Cleave the ribbonized fibers to produce planar cleaves perpendicular to the fiber axis. (Expensive $75,000 laser cleavers are recommended).

2) Route the fibers into connector v-grooves and through alignment holes.

3) Remove debris from the fibers cleaves.

4) Repeat steps 1-3 for each row of fibers.

5) Deposit epoxy into the alignment v grooves and epoxy well.

6) Force each fiber cleave against the back of the array lens to remove trapped air and establish launch and focal planes.

7) Hold each of the multiple fibers in position while the epoxy is cured.

The aforementioned termination procedure works best with ribbonized fiber. Ribbonized fiber bends much easier about an axis perpendicular to the fiber and parallel to the ribbon than an axis perpendicular to the fiber and ribbon. The linear fiber arrangement is less compact than a hexagonal close packed fiber arrangement and requires more jacketing material. The ribbon fibers larger cross sectional area and strong bend preference are less desirable than a loose tube close-packed fiber cable construction.

Several of the multi-fiber expanded beam connector ferrules are molded in one piece from a single polymer using a complex mold where the lens prescriptions are in one steel detail mounted to a slide and the v-grooves and fiber alignment holes are in a second steel detail mounted to a second slide. The pins that form the fiber alignment holes seal against a third steel detail mounted in the mold A or B plate. Significant effort is required to build and maintain the mold so variation is held to a few microns.

The single polymer used in the molded multifiber expanded beam connector ferrules must be free of fillers and contaminants to transmit light consistently. The polymer cannot contain fillers such as glass, carbon or quartz fibers which commonly provide strength and reduce thermal expansion in polymers. The resulting monolithic molded ferrule has less strength and greater expansion/contraction and greater change in attenuation during thermal cycling than ferrules made with filled polymers. Most monolithic multifiber expanded beam ferrules are molded from polyetherimide which has significant absorption 10-20% over the electromagnetic spectrum and thicknesses in use.

The Applicant recognizes the advantages of the expanded beam connector technology and disadvantages with current products. The Applicant has developed an arrayed lens which can mount onto a multi-fiber array ferrule including, but not limited to MT and MTRJ ferrules. A similar or identical array lens can be mounted on the receiving MT ferrule to focus the light into the receiving fiber. The array connectors can have integral or separate alignment pins that can be arranged as pinned/unpinned or hermaphroditically.

The proposed lens array may be made from fused silica, fused quartz, sapphire, silicon, other optical glasses or optical grade polymers with or without materials to reduce the coefficient of thermal expansion. Lenses may be spherical, aspherical or Fresnel and may be coated to minimize reflection, water absorption and/or wear.

Lenses may be shaped for on-axis transmittance or for crossing adjacent fiber signals or for splitting and/or combining signals. The lens array may locate relative to the fiber using ferrule guide pins holes and/or by active alignment and epoxy to maintain position. The lens array can also be located within a frame of a second material that aligns to ferrule alignment holes/pins. The frame may remain on the ferrule assembly or be removed. The frame may have circular holes/pins or holes with flats to interfere with guide pin clearance. Ferrule alignment guide pin holes may be sleeved with a protruding sleeve that is used to align the array. An index material, liquid, epoxy, gel, rigid or semi-rigid material may be placed between the fibers and lens and/or between the lenses to minimize reflection, indirect light and/or seal out contamination.

The array lens may be sized to fit onto a shortened array connector ferrule to fit into standard connector housings. The array ferrule can be of a standard dimension, shortened along the fiber axis, equipped with fiber stubs and index matching material or equipped with fiber stubs for fusion splicing.

The proposed new expanded beam array ferrule design allows:

1) Lenses to be fabricated from numerous materials including glasses, polymers, sapphire and silicon.

2) The manufacturer may terminate, polish, test and inspect the array ferrule using ribbonized or loose tube fiber, standard tools and procedures before adding an array lens.

3) A user may add array lenses to any new or existing multi-fiber ferrule.

The arrayed lens portion 61A, 61B, 61C utilizes lenses that are of similar but different prescriptions in order to more efficiently transmit and focus the light energy across space and through the opposite (receiving) lens. The lenses can be ordered in several variations on the array (such as every-other lens in a row, all lenses in a single row, some lenses on a row with others in the same row, or any variation thereof) and in either single or multiple rows of lenses.

The transmitting lens can be of different substrate material (such as Fused Silica, Sapphire, Multi-Spectral Zinc Sulfide, etc.) than the receiving lens.

The arrays can mount onto a multi-fiber array ferrule including, but not limited to MT and MTRJ ferrules. The array connectors can have integral or separate alignment pins that can be arranged pinned/unpinned or hermaphroditically.

The proposed lens array may be made from fused silica, fused quartz, sapphire, silicon, other optical glasses or optical grade polymers with or without materials to reduce the coefficient of thermal expansion. Lenses may be spherical, aspherical or Fresnel and may be coated to minimize reflection, water absorption and/or wear.

Lenses may be shaped for on axis transmittance or for crossing adjacent fiber signals or for splitting and/or combining signals.

The lens array may locate relative to the fiber using ferrule guide pins holes and/or by active alignment and epoxy to maintain position and/or by utilizing Photolithography to create a pattern or indicator mark for alignment or assembly purposes. The lens array can also be located within a frame of a second material that aligns to ferrule alignment holes/pins. The frame may remain on the ferrule assembly or be removed. The frame may have circular holes/pins or holes with flats to interfere with guide pin clearance. Ferrule alignment guide pin holes may be sleeved with a protruding sleeve that is used to align the array.

An index material, liquid, epoxy, gel, rigid or semi-rigid material may be placed between the fibers and lens and/or between the lenses to minimize reflection, indirect light and/or seal out contamination.

The proposed new expanded beam array ferrule design allows the lenses or lens array can be fabricated so the prescriptions of the transmitting lenses or lens array can be either identical or different from the receiving lens or array; and the transmitting lens or lens array can be of either identical or different material from the receiving lens or lens array.

The Lens Configuration Differences Matrix below shows the overall performance (tolerance) improvement for the different parameters. The Spot Size is the most significant parameter, but Angle Reduction is important as well.

| Lens Configuration | Transmitting Lens Material | Receiving Lens Material | Percent Spot Size Reduction | Percent Angle Reduction | Focus Distance | Percent Transmittance |
| --- | --- | --- | --- | --- | --- | --- |
| Identical | Fused Silica | Fused Silica | 0% | 15% | 200 um | 99.44% |
| Asymmetric | Sapphire | Sapphire | 16% | 15% | 360 um | 99.15% |
| Asymmetric | Sapphire | Fused Silica | 20% | 27% | 230 um | 99.38% |

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A fiber optic ferrule comprising:
a first part for holding a plurality of optical fibers, said first part having a first end and a second end, wherein said second end is opposite to said first end;
a plurality of optical fibers entering at said first end of said first part and extending to said second end of said first part, wherein ends of said plurality of optical fibers are approximately flush or slightly protruding along a surface defining said second end of said first part;
a second part having a first face and a second face, wherein said first face of said second part abuts said second end of said first part, and wherein said second face is opposite to said first face; and
a plurality of lenses formed in said second part, wherein each lens of said plurality of lenses overlies a flush or protruding end of one of said plurality of optical fibers, wherein said plurality of lenses includes lenses of different prescriptions and wherein said plurality of lenses includes a first set of lenses having a same first prescription optimized to receive light from an optical fiber end and transmit light away from the lens and a second set of lenses having a same second prescription, different from the first prescription, optimized to receive light into the lens and focus light onto an optical fiber end, wherein a first distance is defined from a first plane of said first end of said first part to a second plane of said second end of said first part, a second distance is defined from a third plane of said first face of said second part to a fourth plane of said second face of said second part, and wherein a sum of said first and second distances is 8 mm.

2. The fiber optic ferrule of claim 1, wherein said first part is formed of a polymer impregnated with a material to provide strength and reduce the coefficient of thermal expansion of said first part.

3. The fiber optic ferrule of claim 1, wherein said second part is formed of fused silica, fused quartz, sapphire, silicon, other optical glasses or optical grade polymers.

4. The fiber optic ferrule of claim 1, further comprising:
an optical epoxy attaching each lens of said plurality of lenses to an end of one of said plurality of optical fibers.

5. The fiber optic ferrule of claim 1, further comprising:
a first hole formed in said first part for accepting a first guide pin;
a second hole formed in said first part for accepting a second guide pin;
a third hole formed in said second part for accepting the first guide pin;
a fourth hole formed in said second part for accepting the second guide pin; and
a first guide pin passing through said first and third holes.

6. The fiber optic ferrule of claim 5, wherein said third hole includes at least one protruding surface formed on its perimeter extending toward a center of said third hole to create a frictional engagement with said first guide pin.

7. The fiber optic ferrule of claim 6, wherein said first guide pin is attached within said first part and extends outwardly from said first hole through said third hole for engagement with another fiber optic connector, and wherein a second guide pin is part of the another fiber optic connector and extends through said fourth hole and into said second hole.

8. The fiber optic ferrule of claim 1, wherein said second part is formed of a bezel at least partially surrounding a lenses portion containing said plurality of lenses.

9. The fiber optic ferrule of claim 8, wherein a forward edge of said bezel defines said second face of said second part and extends further away from said second end of said first part than any part of said lenses portion, such that said plurality of lenses are recessed into said second face of said second part.

10. The fiber optic ferrule of claim 1, wherein lenses of said first set of lenses alternate with lenses of said second set of lenses in a single row.

11. The fiber optic ferrule of claim 1, wherein lenses of said first set of lenses are located in a first row and lenses of said second set of lenses are located in a second row.

12. A fiber optic ferrule comprising:
a frame for holding a plurality of optical fibers, said frame having a first end and a second end, wherein said second end is opposite to said first end;
a plurality of optical fibers entering at said first end of said frame and extending toward said second end of said frame; and
a lenses section formed at said second end of said frame, said lenses section having a plurality of lenses, wherein each lens of said plurality of lenses overlies an end of one of said plurality of optical fibers, and wherein said plurality of lenses includes lenses of different prescriptions, wherein said plurality of lenses includes a first set of lenses having a same first prescription optimized to receive light from an optical fiber end and transmit light away from the lens and a second set of lenses having a same second prescription, different from the first prescription, optimized to receive light into the lens and focus light onto an optical fiber end, wherein said frame and said lenses section are integrally formed of a common material.

13. The fiber optic ferrule of claim 12, wherein lenses of said first set of lenses alternate with lenses of said second set of lenses in a single row.

14. A fiber optic ferrule comprising:
a frame for holding a plurality of optical fibers, said frame having a first end and a second end, wherein said second end is opposite to said first end;
a plurality of optical fibers entering at said first end of said frame and extending toward said second end of said frame; and
a lenses section formed at said second end of said frame, said lenses section having a plurality of lenses, wherein each lens of said plurality of lenses overlies an end of one of said plurality of optical fibers, and wherein said plurality of lenses includes lenses of different prescriptions, wherein said plurality of lenses includes a first set of lenses having a same first prescription optimized to receive light from an optical fiber end and transmit light away from the lens and a second set of lenses having a same second prescription, different from the first prescription, optimized to receive light into the lens and focus light onto an optical fiber end, wherein said frame is composed of a first part and a second part, wherein said first part holds said plurality of optical fibers, said first part having a first end and a second end, and said second end is opposite to said first end, and wherein said second part holds said lenses section, said second part having a first face and a second face, said first face of said second part abuts said second end of said first part, and said second face is opposite to said first face.

15. The fiber optic ferrule claim 14, further comprising:
an optical epoxy attaching each lens of said plurality of lenses to an end of one of said plurality of optical fibers.

16. The fiber optic ferrule of claim 14, wherein said first part is formed of a polymer impregnated with a material to provide strength and reduce the coefficient of thermal expansion of said first part.

17. The fiber optic ferrule of claim 16, wherein said second part is formed of fused silica, fused quartz, sapphire, silicon, other optical glasses or optical grade polymers.

18. The fiber optic ferrule of claim 14, further comprising:
a bezel at least partially surrounding said lenses section.

19. The fiber optic ferrule of claim 18, wherein an optical epoxy attaches each lens of said plurality of lenses to an end of one of said plurality of optical fibers.

20. The fiber optic ferrule of claim 19, wherein said lens section is adjusted in its position relative to said bezel before curing said optical epoxy to attach each lens of said plurality of lenses to an end of one of said plurality of optical fibers.

* * * * *